(12) United States Patent
Bergmann et al.

(10) Patent No.: US 6,640,169 B2
(45) Date of Patent: Oct. 28, 2003

(54) DYNAMIC HUMAN-MACHINE INTERFACE DEVICE AND METHOD

(75) Inventors: Carsten Bergmann, Campbell, CA (US); Andre Oberschachtsiek, Gifhorn (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 10/299,099

(22) Filed: Nov. 18, 2002

(65) Prior Publication Data

US 2003/0120397 A1 Jun. 26, 2003

Related U.S. Application Data

(63) Continuation of application No. 09/814,233, filed on Mar. 21, 2001, now abandoned.

(51) Int. Cl.[7] .......................... G06F 17/00; B60K 37/00
(52) U.S. Cl. ...................... 701/36; 701/1; 345/334
(58) Field of Search ................. 701/1, 36; 345/333, 345/334; 709/203; 700/83

(56) References Cited

U.S. PATENT DOCUMENTS

| | | | | |
|---|---|---|---|---|
| 5,821,935 A | * | 10/1998 | Hartman et al. | ............ 345/349 |
| 5,944,784 A | | 8/1999 | Simonoff et al. | |
| 6,091,411 A | | 7/2000 | Straub et al. | |
| 6,236,909 B1 | * | 5/2001 | Colson et al. | ................ 701/1 |
| 6,253,122 B1 | * | 6/2001 | Razavi et al. | ................... 701/1 |
| 6,370,449 B1 | * | 4/2002 | Razavi et al. | ................... 701/1 |

FOREIGN PATENT DOCUMENTS

| | | |
|---|---|---|
| DE | 196 27 923 | 1/1998 |
| DE | 197 25 916 | 1/1999 |
| DE | 198 07 410 | 8/1999 |
| EP | 0 987 628 | 3/2000 |
| EP | 0 987 867 | 3/2000 |
| EP | 1 048 507 | 11/2000 |
| WO | WO 97/34388 | 9/1997 |
| WO | WO 98/51991 | 11/1998 |

* cited by examiner

Primary Examiner—Michael J. Zanelli
(74) Attorney, Agent, or Firm—Kenyon & Kenyon

(57) ABSTRACT

A dynamic HMI device includes an interface section, which is configured to display an interface of at least one applet configured to control at least one function of a motor vehicle. The dynamic HMI device further includes a memory unit, which includes: a first memory section configured to store data representing at least one vehicle-specific parameter; a second memory section configured to store data for each of a plurality of vehicles representing a respective appearance of the at least one applet; and a third memory section configured to store data representing at least one application, each application corresponding to a respective applet. The interface section is configured to display the interface of the at least one applet in accordance with one of the plurality of vehicles corresponding to the vehicle-specific parameter represented by the data stored in the first memory section.

20 Claims, 2 Drawing Sheets

DYNAMIC HUMAN-MACHINE INTERFACE DEVICE AND METHOD

CROSS-REFERENCE TO RELATED APPLICATIONS

This application is a continuation of U.S. patent application Ser. No. 09/814,233, filed on Mar. 21, 2001, now abandoned, which is expressly incorporated herein in its entirety by reference thereto.

FIELD OF THE INVENTION

The present invention relates to a dynamic human-machine interface device and method.

BACKGROUND INFORMATION

Static human-machine interface (HMI) devices and methods are generally used in numerous applications, including automotive applications. These static HMI devices and methods rely on a hard-programmed display, which is directly and inseparably linked to the application programs that operate the display. Such devices and methods, therefore, cannot be used in combination with a client/server architecture. Furthermore, software applications written for operating these devices cannot generally be reused for other devices.

It is therefore an object of the present invention to provide a dynamic HMI device and method in which the application is independent of the display.

It is a further object of the present invention to provide a dynamic HMI device and method in which the applications may be displayed in accordance with a selective one of a plurality of vehicles.

SUMMARY

The above and other beneficial objects of the present invention are achieved by providing a dynamic HMI device and method as described herein. In one embodiment, the dynamic HMI device includes an interface section, which is configured to display an interface of at least one applet configured to control at least one function of a motor vehicle. The dynamic HMI device further includes a memory unit, which includes: a first memory section configured to store data representing a vehicle-specific parameter; a second memory section configured to store, for each of a plurality of vehicles, data representing a respective appearance of the at least one applet; and a third memory section configured to store data representing at least one application, each application corresponding to a respective applet, each application including at least one function. The interface section is configured to display the interface of the at least one applet in accordance with one of the plurality of vehicles corresponding to the vehicle-specific parameter represented by the data stored in the first memory section.

The method according to the present invention includes the steps of: storing data representing at least one vehicle-specific parameter in a first memory section of a memory unit; storing data for each of a plurality of vehicles representing an appearance of at least one applet in a second memory section of the memory unit; storing data representing at least one application in a third memory section of the memory unit, each application corresponding to a respective applet, each application including at least one function; reading the data from the first memory section; reading the data from the second memory section representing the appearance of the at least one applet corresponding to one of the plurality of vehicles in accordance with the data read from the first memory section; reading the data from the third memory section corresponding to the at least one applet; and displaying the interface of the at least one applet corresponding to the one of the plurality of vehicles in accordance with the data read from the first, second and third memory sections.

DETAILED DESCRIPTION

Figure 1:
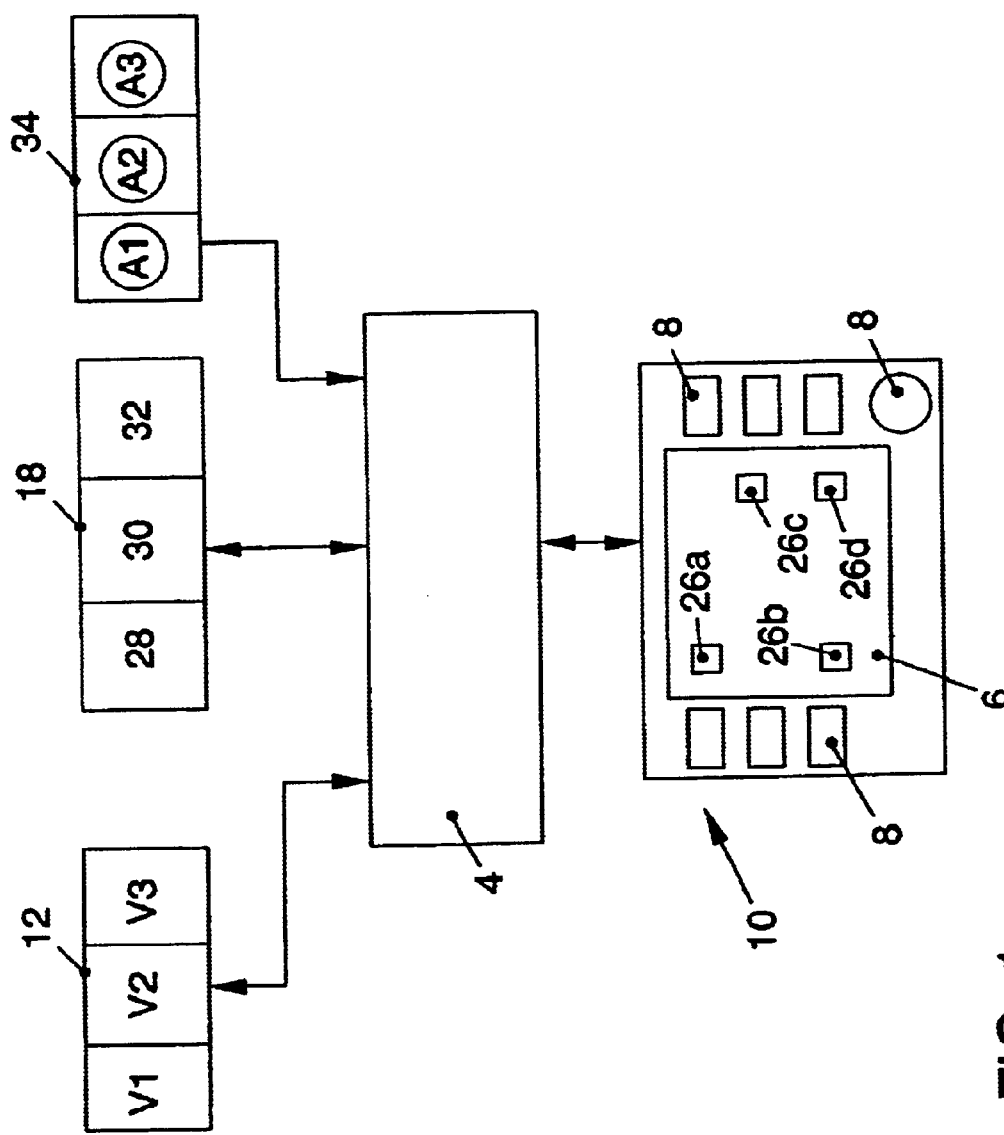
FIG. 1 is a schematic view of a first example embodiment of a dynamic human-machine interface device according to the present invention.
Figure 2:
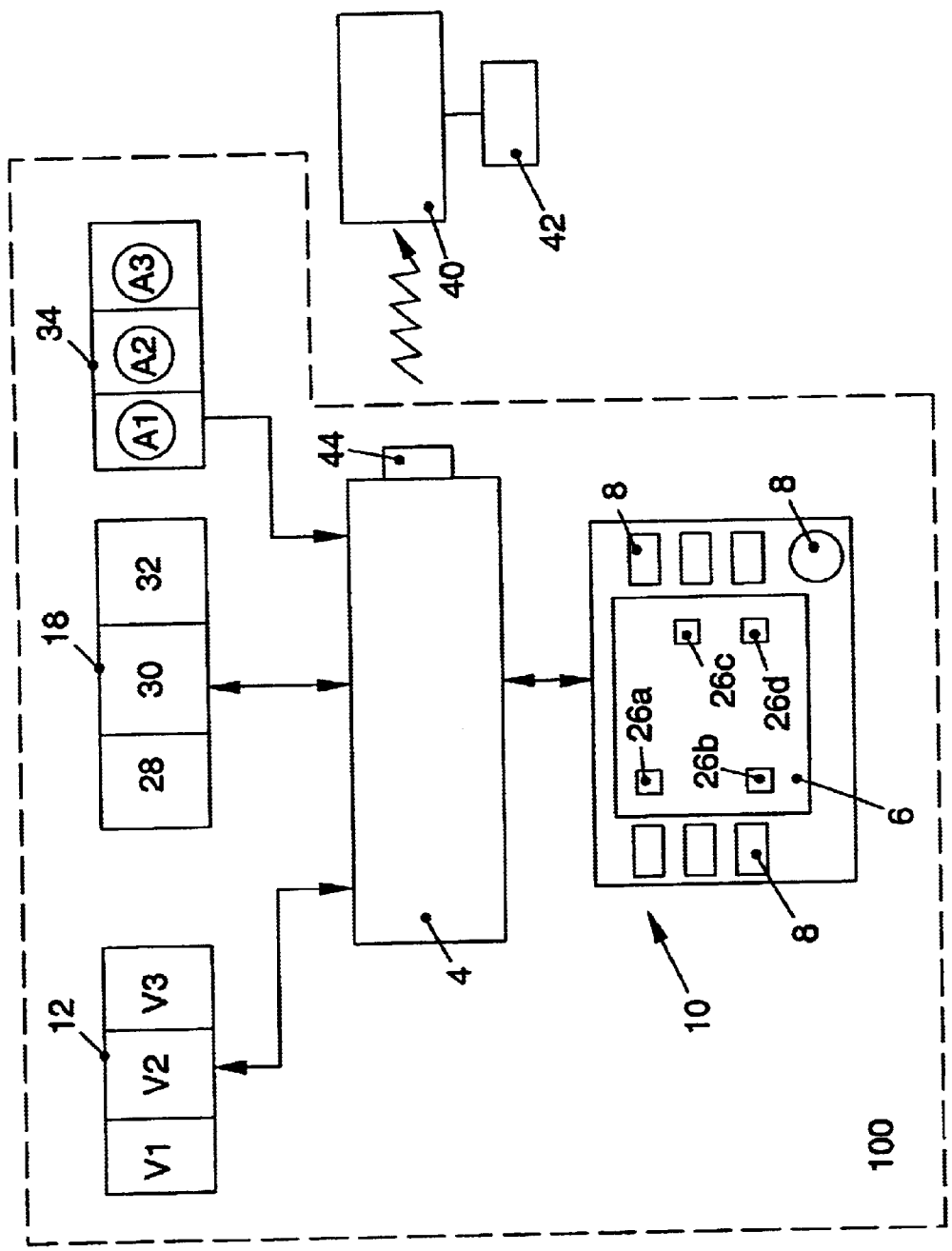
FIG. 2 is a schematic view of a second example embodiment of the dynamic human-machine interface device according to the present invention.

Those skilled in the art will gain an appreciation of the present invention from a reading of the following description when viewed in conjunction with the accompanying drawings of FIGS. 1 and 2. The individual reference characters designate the same or similar elements throughout the several views.

Referring to FIG. 1, there is seen a schematic view of a first example embodiment of a dynamic human-machine interface device 10 according to the present invention. The dynamic HMI device 10 includes a memory unit, which includes a first memory section 12, a second memory section 18 and a third memory section 34. The first memory section 12 is configured to store data representing at least one vehicle-specific parameter, such as, for example, data representing a make, a model, a trim level, an option package, etc. of a vehicle, e.g., an automobile. It should be understood that although FIG. 1 illustrates that the first memory section 12 is configured to store the vehicle-specific parameter corresponding to one of three vehicle $V_1$, $V_2$, $V_3$, the first memory section 12 may be configured to store data representing the vehicle-specific parameter corresponding to one of any number of vehicles. The first memory section 12 may store the data representing the vehicle-specific parameter in accordance with an XSL (eXtensible Stylesheet Language) standard. The dynamic HMI device 10 also includes a transform section 16, which may be configured, for example, according to an XSLT (eXtensible Stylesheet Language Transformation) function. The transform section 16 is configured to read the data from the first memory section 12 via line 14.

The second memory section 18 is configured to store first data 28, second data 30 and third data 32. The first data 28 represents a generic HMI, the second data 30 represents a definition of an applet appearance, as more fully described below, and the third data 32 represents a destination link, as also more fully described below. The second memory section 18 may be configured to store the first data 28, the second data 30 and/or the third data 32 in accordance with an XML (eXtensible Markup Language) standard. As illustrated in FIG. 1, the transform section 16 is configured to read the first data 28 from the second memory section 18 via line 38.

The dynamic HMI device includes a browser section 22. The transform section 16, which, as indicated above, is configured to read the data from the first memory section 12 and from the second memory section 18, is further configured to output data to the browser section 22 via line 20. The transform section 16 may be configured to output data to the browser section 22 in accordance with an HTML (HyperText Markup Language) standard.

The browser section 22 is configured to read the second data 30 from the second memory section 18 via line 40 and to output to the second memory section 18 via the line 40. As indicated above, the second data 30 may include data representing the definition of an applet appearance. Thus, the browser section 22 displays an applet 24 in accordance with the second data 30 read from the second memory section 18. The second data 30 may include data representing the definition of a plurality of applet appearances, each applet appearance corresponding to a respective one of the plurality of vehicles representable by the data stored in the first memory section 12. Thus, the browser section 22 may be configured to read the second data 30 stored in the second memory section 18 in accordance with the data read from the first memory section 12 by the transform section 16.

The applet 24 may include interface elements, such as, for example, buttons. The applet 24 illustrated in FIG. 1 includes four buttons 26a, 26b, 26c, 26d. It should be appreciated that any appropriate number of interface elements may be provided. Each interface element, such as the buttons 26a, 26b, 26c, 26d, may correspond to a predetermined function and/or to a predetermined link. The second memory section 18 stores the second data 32, which represent the destination links or functions corresponding to the interface elements. The browser section 22 is configured to read the third data 32 from the second memory section 18 via line 42. The browser section 22 may be configured to read the second data 30 from the second memory section 18, output to the second memory section 18 and/or read the third data 32 from the second memory section via the lines 40, 42 in accordance with a DOM (Document Object Model) standard.

The dynamic HMI device 10 further includes a third memory section 34, which is configured to store data representing a plurality of applications $A_1, A_2, A_3$, each including at least one function. It should be appreciated that although FIG. 1 illustrates the third memory section 34 storing data representing three applications $A_1, A_2, A_3$, the third memory section 34 may be configured to store data representing any appropriate number of applications. The applications $A_1, A_2, A_3$ may include, for example, an audio control application, a navigation application, an e-mail application, etc. The data representing the applications $A_1, A_2, A_3$ may be stored in the third memory section 34 in the form of, for example, JAVA code. The browser section 22 is configured to communicate with the third memory section 34 via line 36. It should be appreciated that a data processing unit (CPU) 44 may be provided to control the functions of the dynamic HMI device 10 via line 46 and that at least one input device may be provided for receiving an input from a user. The input device may include, for example, a touch screen, a mouse, a keyboard, a voice input device, etc. Furthermore, at least one output device may be provided for providing an output to the user. The output device may include, for example, a display device, an audio output device, etc.

By providing data representing the applet appearance in the second data 30 of the second memory section 18 for each of a plurality of vehicles $V_1, V_2, V_3$, one of which is corresponds to the data stored in the first memory section 12, along with data representing the generic HMI in the first data 28 of the second memory section 18, the dynamic HMI device 10 according to the present invention may display the applications $A_1, A_2, A_3$ in accordance with the vehicle $V_1, V_2, V_3$, in which the dynamic HMI device 10 is installed based on the vehicle-specific parameter represented by the data stored in the first memory section 12.

The first data 28 of the second memory section 18 may include data representing, for example, images, text, background graphics, etc. The data stored in the first memory section 12 may define, for example, the appearance of the applet 24 that is vehicle-specific and independent of the applications $A_1, A_2, A_3$, represented by the data stored in the third memory section 34. Thus, the applications $A_1, A_2, A_3$, when being executed as applets 24 by the browser section 22, appear in a common format in accordance with the data representing the vehicle-specific parameter stored in the first memory section 12. Thus, a corporate identity, for example, may be maintained for all applications $A_1, A_2, A_3$, corresponding to each vehicle $V_1, V_2, V_3$. That is, each application $A_1, A_2, A_3$ may be executed and displayed by the browser section 22 according to vehicle model line, brand line, trim level, option package, etc.

It should be appreciated that any one or more of the first memory section 12, the second memory section 18 and the third memory section 34 may be integrated into a single logical or physical memory unit, such as, for example, an electronic memory device, a magnetic memory device, an optical memory device, a magneto-optical memory device, etc. Any one or more of the first memory section 12, the second memory section 18 and the third memory section 34 may be wholly or partially removable, semipermanent, permanent, etc. Furthermore, any one or more of the first memory section 12, the second memory section 18 and the third memory section 34 may be installed in the vehicle in which the dynamic HMI device 10 is installed or located remotely therefrom.

Referring to FIG. 2, there is seen a schematic view of a second example embodiment of the dynamic HMI device 10'. In FIG. 2, like elements are noted with an accompanying prime. As illustrated in FIG. 2, the dynamic HMI device 10' includes a first memory section 12', a browser section 22', a third memory section 34' and a CPU 44'. The CPU 44' communicates with the browser section 22' via line 46', the browser section 22' communicates with first memory section 12' via line 14', and the browser section 22' communicates with third memory section 34' via line 36'. These components are illustrated as being provided in vehicle 100 External to vehicle 100 is an infrastructure 102, which includes a server device 48 configured to communicate with the browser section 22' via request line 50 and via response line 52. The server device 48 may include, for example, a web server, and the request line 50 and response line 52 may be configured as wireless communication lines, such as, for example, RF communication lines. The server device 48 is further configured to communicate with a logic unit 54 via line 56, and the logic unit 54 is configured to communicate with second memory section 18' via line 58. The second memory section 18' is configured to store the first data 28', the second data 30' and the third data 32', as more fully described above. The browser section 22' is configured to communicate with the second memory section 18' via the server device 48 and logic device 54. The infrastructure 102 further includes a fourth memory section 60, which is configured to communicate with the logic unit 54 via line 62. The fourth memory section 60 may be configured to store data representing, for example, additional or revised applications $A_4, A_5, A_6$. Thus, it should be appreciated that the dynamic HMI device 10' may provide access to the applications $A_1, A_2, A_3, A_4, A_5, A_6$ for administrative purposes, may provide for the addition and/or maintenance of dynamic content, such as, for special event, may provide for changing, updating and/or maintaining the appearance of the HMI and may provide for the addition of new services without access to the individual vehicles.

Thus, the aforementioned objects and advantages of the present invention are most effectively attained. Although two example embodiments of the present invention have been disclosed and described herein, it should be understood that this invention is in no sense limited thereby and that its scope is to be determined by that of the appended claims. It should be further understood that numerous modifications may be made to the present invention without departing from the spirit and scope thereof.

What is claimed is:

1. A dynamic human-machine interface device, comprising:

an interface section, the interface section being configured to display an interface of at least one applet, the applet being configured to control at least one function of a motor vehicle; and a memory unit, the memory unit including:
   a first memory section configured to store data representing at least one vehicle-specific parameter;
   a second memory section configured to store data for each of a plurality of vehicles representing a respective appearance of the at least one applet; and
   a third memory section configured to store data representing at least one application, each application corresponding to a respective applet;

wherein the interface section is configured to display the interface of the at least one applet in accordance with one of the plurality of vehicles corresponding to the at least one vehicle-specific parameter represented by the data stored in the first memory section.

2. The dynamic human-machine interface device according to claim 1, further comprising a data processing unit configured to execute the at least one applet.

3. The dynamic human-machine interface device according to claim 1, further comprising at least one output device.

4. The dynamic human-machine interface device according to claim 1, further comprising at least one input device.

5. The dynamic human-machine interface device according to claim 1, wherein the first memory section, the second memory section and the third memory section are provided in a motor vehicle.

6. The dynamic human-machine interface device according to claim 1, wherein at least one of the first memory section, the second memory section and the third memory section is provided in a motor vehicle and at least one of the first memory section, the second memory section and the third memory section is provided external to the motor vehicle.

7. The dynamic human-machine interface device according to claim 6, further comprising a server device configured to communicate between the interface section and the at least one of the first memory section, the second memory section and the third memory section provided external to the motor vehicle.

8. The dynamic human-machine interface device according to claim 6, wherein the first memory section and the third memory section are provided in the motor vehicle and the second memory section is provided external to the motor vehicle.

9. The dynamic human-machine interface device according to claim 8, further comprising a server device configured to communicate between the second memory section and the interface device.

10. The dynamic human-machine interface device according to claim 9, wherein the memory unit further comprises a fourth memory section provided external to the motor vehicle, the server device further configured to communicate between the fourth memory section and the interface device.

11. The dynamic human-machine interface device according to claim 10, wherein the fourth memory section is configured to store data representing at least one additional application, each additional application corresponding to a respective applet.

12. A method for providing a dynamic human-machine interface, comprising the steps of:

storing data representing at least one vehicle-specific parameter in a first memory section of a memory unit;
   storing data for each of a plurality of vehicles representing a respective appearance of at least one applet in a second memory section of the memory unit;
   storing data representing at least one application in a third memory section of the memory unit, each application corresponding to a respective applet, each application including at least one function;
   reading the data from the first memory section;
   reading the data from the second memory section representing the appearance of the at least one applet corresponding to one of the plurality of vehicles in accordance with the data read from the first memory section;
   reading the data from the third memory section corresponding to the at least one applet; and
   displaying the interface of the at least one applet corresponding to the one of the plurality of vehicles in accordance with the data read from the first, second and third memory sections.

13. The method according to claim 12, further comprising the step of providing an output via at least one output device.

14. The method according to claim 12, further comprising the step of receiving an input via at least one input device.

15. The method according to claim 12, wherein the first memory section, the second memory section and the third memory section are provided in a motor vehicle.

16. The method according to claim 12, wherein at least one of the first memory section, the second memory section and the third memory section is provided in a motor vehicle, and at least one of the first memory section, the second memory section and the third memory section is provided external to the motor vehicle.

17. The method according to claim 16, wherein the first memory section and the third memory section are provided in the motor vehicle and the second memory section is provided external to the motor vehicle.

18. The method according to claim 17, further comprising the step of storing data representing at least one additional application in a fourth memory section, the fourth memory section being provided external to the motor vehicle, each additional application corresponding to a respective applet.

19. The method according to claim 12, further comprising the step of adding data to at least one of the first memory section, the second memory section and the third memory section.

20. The method according to claim 12, further comprising the step of revising the data stored in at least one of the first memory section, the second memory section and the third memory section.

* * * * *